Patented Sept. 9, 1952

2,610,140

UNITED STATES PATENT OFFICE 2,610,140

COMPOSITION FOR THE PREVENTION AND CONTROL OF COCCIDIOSIS IN POULTRY

Vincent A. Santivasi, Springfield, Pa., assignor to Barker, Moore & Mein Company, Philadelphia, Pa., a corporation of Pennsylvania No Drawing. Application April 21, 1950, Serial No. 157,406

4 Claims. (Cl. 167—53.1)

The present invention relates to a novel composition having valuable properties making it available for the prevention and control of coccidiosis in poultry. The invention also relates to a composition in a form adapted for oral ingestion by poultry which prevents and controls coccidiosis in poultry.

Coccidiosis, particularly cecal (bloody) coccidiosis, in poultry such as chickens, turkeys, and other fowl, is caused by a micro-organism which attacks the intestinal wall thereof. The standard treatment for years has involved mixing finely-divided sulfur with feed the poultry is to eat. The sulfur by itself is only consistently effective in concentrations from about .5% upward, and at these concentrations produces adverse effects on the poultry, such as by affecting the growth rate, and the like. There is also available on the market a group of compounds known as tetraalkylthiuram sulfides, which are known to have disinfecting properties, but which, when administered to poultry, as by mixing with feed, at a level necessary to prevent and control coccidiosis such as about .08% and upwards, are toxic.

It is a principal object of the present invention to provide a composition which, when mixed with a vehicle adapted for oral ingestion by poultry, such as poultry feed, water, and the like, in a prescribed concentration, is completely effective for the prevention and control of coccidiosis, yet is non-toxic and produces no adverse effects on the poultry.

A further object is to provide a material which may be fed directly to poultry and which effectively prevents and controls coccidiosis without producing ill effects on the poultry.

Other objects will be apparent from a consideration of the following specification and the claims.

The composition of the present invention comprises finely-divided sulfur and a tetraalkylthiuram sulfide in a ratio of at least one part, by weight, of the former to one part, by weight, of the latter. In the composition of the invention, the weight ratio of the sulfur to the tetraalkylthiuram sulfide may reach as high as 50 to 1. The preferred weight ratio, however, lies between about 4 to 1 and about 16 to 1.

The composition of the present invention is based upon the discovery that when finely-divided sulfur and a tetraalkylthiuram sulfide are intimately mixed within the stated weight ratios, the concentrations of each in a poultry feed mix or in water to provide complete prevention and control of coccidiosis is markedly less than that required when each is used alone. The concentration levels of each, in combination, in a feed or in water, is much less than would be expected from a knowledge of the effect of each separately, and the therapeutic result is evidently not merely the additive effects of each when combined. Taking tetraethylthiuram disulfide as a typical example, as stated, a concentration of about .08% thereof, by itself in feed would be required to completely prevent coccidiosis, and this concentration is toxic. As also stated, a concentration of finely-divided sulfur of about .5% or more, by itself, would be required to completely prevent coccidiosis, this concentration often adversely affecting growth rate of the poultry. However, a combination of the finely-divided sulfur and the tetraethylthiuram disulfide in a weight ratio of about 8 to 1, for example, when incorporated in feed provides complete prevention of coccidiosis at a concentration corresponding to only .113% finely-divided sulfur and .014% tetraethylthiuram disulfide respectively.

Referring more particularly to the sulfur employed in the composition of the invention, it is, as stated, finely-divided. As a general rule, the more finely-divided the sulfur, the more effective it is in the treatment of coccidiosis in poultry. For this reason, at least 90% of the sulfur employed in the composition will have a particle size of less than about 30 microns, and preferably at least 90% will have a particle size of less than about 15 microns. A preferred form of sulfur is that known as wettable sulfur, and which contains a small percentage, usually less than about 1% based on the weight of the sulfur, of a wetting agent. Other agents conventionally added to sulfur, used for veterinary purposes, such as dispersing agents, and the like, may be incorporated with the sulfur in small amounts such as from about .1 to about 1–2%.

Referring to the tetraalkylthiuram sulfide employed in the composition of the invention it may be either a monosulfide or a disulfide, and the alkyl groups may contain from 1 to 3 carbon atoms, that is, they may be methyl, ethyl and/or propyl groups. Such tetraalkylthiuram sulfides correspond to the following structural formula:

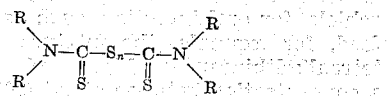

Where $n$ is either 1 (the monosulfide) or 2 (the disulfide); and where the alkyl groups R are selected from the group consisting of methyl, ethyl and propyl. The various alkyl groups on the molecule need not be the same in all cases, for instance, the compound may be a dimethyl, diethylthiuram monosulfide or disulfide. However, it is preferred that, in any particular compound the various alkyl groups be the same such as in the case of the tetramethyl-, tetraethyl-, or tetrapropylthiuram monosulfide or disulfide. Of the compounds available, the tetraethylthiuram sulfide is preferred.

As stated, in the product of the present invention, the ratio, by weight, of the finely-divided sulfur to the tetraalkylthiuram sulfide will lie within a specified range. To realize the synergistic effect of these two components, the sulfur will be present in an amount, by weight, at least as great as the tetraalkylthiuram sulfide, that is, the ratio, by weight, of the sulfur to the tetraalkylthiuram sulfide will be at least about 1 to 1. The synergistic effect of the combination increases to an optimum at ratios of sulfur to tetraalkylthiuram sulfide between about 4 to 1 and about 16 to 1. With ratios of sulfur to tetraalkylthiuram sulfide beyond about 50 to 1 no significant improvement is obtained in combining these two materials.

The composition of the present invention may, and often advantageously does, also have incorporated therein other materials having therapeutic, nutritional or other beneficial effects on poultry. For example, edible diluents such as vitamins, minerals, mash feed, scratch feed, water, and the like, may be incorporated in the composition in accordance with well-known practice. Thus, the product may consist essentially of the finely-divided sulfur and the tetraalkylthiuram sulfide, in the stated ratio, which may be mixed with feed, water, and the like for administration to the poultry; or the product may comprise, in addition to the finely-divided sulfur and tetraalkythiuram sulfide, in the stated ratio, a vehicle adapted for oral ingestion by the poultry, such as vitamin-containing materials, mineral-containing materials, mash feed, scratch feed, water, mixtures of these, and the like, in any proportion up to the point where the sulfur and the tetraalkyl thiuram sulfide are at the concentration therein desired for oral ingestion by the poultry. The term "poultry mash feed," refers, of course, to the general class of materials comprising grain and grain by-products, seed and bean meal, fish and meat scrap, and the like, and includes the various types including chicks' and turkeys' starter mash, starter-grower mash, grower mash, broiler mash, and the like. "Scratch feed" will be understood to mean whole and/or cracked grain such as cracked corn and the like. The term "feed" is, of course, generic to "mash feed" and "scratch feed."

The concentration of the sulfur and the tetraalkylthiuram sulfide in the vehicle desired for oral ingestion will vary depending upon the particular ratio of sulfur to tetraalkylthiuram sulfide selected and the particular vehicle selected, although, in general, the concentration of the mixture of sulfur and tetraalkylthiuram sulfide in the vehicle will range from about 0.025% to about 1%, by weight. In admixture with a solid vehicle, for oral ingestion, such as poultry mash feed, for example, the mixture of sulfur and tetraalkylthiuram sulfide is advantageously at a concentration between about 0.05% and about 1%, by weight. When mixed with water on the other hand, the mixture of sulfur and tetraalkylthiuram sulfide is advantageously in a concentration between about 0.025% and about .5%, by weight.

No problem will be encountered in the preparation of the product of the invention. The sulfur and the tetraalkylthiuram sulfide are finely-divided solids, and the preparation of the present product merely involves a physical mixing of the two. For this purpose, ordinary mixing aparatus may be employed. Any other additives of the type mentioned may also be physically mixed with the sulfur and tetraalkylthiuram sulfide.

The nature of the product of the present invention may be more readily understood from a consideration of the following specific example which is given solely for the purpose of illustration and is not to be considered as limiting the scope of the invention in any way.

*Example*

1613 grams of sulfur having a particle size less than 30 microns and such that 90% thereof has a particle size of 7–8 microns or less (with this sulfur had been incorporated about 0.33% of a wetting agent, about 0.25% of a dispersing agent, about 0.5% of a mucilaginous material for facilitating adherence of the sulfur to the intestinal walls, and about 1% of tricalcium phosphate); 180 grams of tetraethylthiuram disulfide, and 11.35 grams of vitamin D activated animal sterol are mixed and made up to five pounds with finely-divided calcium carbonate. The ratio of sulfur to tetraethylthiuram sulfide is about 8 to 1.

This mixture provides a completely effective preventative and control for coccidiosis when incorporated in one ton of poultry mash feed, comprising corn meal, alfalfa meal, wheat bran, wheat middlings, ground oats, soy bean oil meal, meat scrap, fish meal, salt, mineral mixture and vitamin mixture.

The following table shows the effect of sulfur alone, of a tetraalkythiuram sulfide alone and of the product of the invention in the control of coccidiosis in poultry innoculated with coccidiosis:

| Percent drug in mash | Mortality due to Bloody (cecal) coccidiosis |
|---|---|
| | Percent |
| 1. Negative control (no medication, no innoculation) | 0 |
| 2. Positive control (no medication, innoculation with coccidiosis) | 50 |
| 3. .50% sulfur | 0 |
| 4. .25% sulfur | 20 |
| 5. .113% sulfur | 30 |
| 6. .014% tetraethylthiuram disulfide | 10 |
| 7. .113% sulfur and .014% tetraethylthiuram disulfide | 0 |
| 8. .243% sulfur and .007% tetraethylthiuram disulfide | 0 |

Considerable modification is possible in the selection of the particular ingredients as well as proportions thereof, without departing from the scope of the invention.

I claim:

1. A composition for the prevention and control of coccidiosis in poultry comprising a mixture of finely-divided sulfur and a tetraalkylthiuram sulfide having the following structural formula:

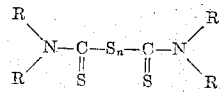

Where $n$ is an integer from 1 to 2; and where the alkyl groups R are selected from the group consisting of methyl, ethyl and propyl, the ratio, by weight, of sulfur to tetraalkylthiuram sulfide being between about 1 to 1 and about 50 to 1.

2. The product of claim 1 wherein the ratio, by weight, of sulfur to tetraalkylthiuram sulfide is between about 4 to 1 and about 16 to 1.

3. A composition for the prevention and control of coccidiosis in poultry comprising a mixture of finely-divided sulfur and tetraethylthiuram disulfide, the ratio, by weight, of sulfur to tetraethylthiuram disulfide being between about 1 to 1 and about 50 to 1.

4. The product of claim 3 wherein the ratio, by weight, of sulfur to tetraethylthiuram disulfide is between about 4 to 1 and about 16 to 1.

VINCENT A. SANTIVASI.

REFERENCES CITED

The following references are of record in the file of this patent:

UNITED STATES PATENTS

| Number | Name | Date |
| --- | --- | --- |
| 2,279,421 | Tisdale | Apr. 14, 1942 |

OTHER REFERENCES

Herrick, American Journal of Veterinary Research, January 1942, pages 117 to 127.

Milks, Veterinary Pharmacology, Materia Medica and Therapeutics, 6th edition (1949), page 554.